G. S. WALKER, ERIE, PA.

118309  Animal Trap.  PATENTED AUG 22 1871

Witnesses,  
Jno. K. Hallock  
J. R. Evans

Inventor,  
Geo. S. Walker

UNITED STATES PATENT OFFICE.

GEORGE S. WALKER, OF ERIE, PENNSYLVANIA.

IMPROVEMENT IN ANIMAL-TRAPS.

Specification forming part of Letters Patent No. 118,309, dated August 22, 1871.

*To all whom it may concern:*

Be it known that I, GEORGE S. WALKER, of the city and county of Erie and State of Pennsylvania, have invented a new and Improved Animal-Trap; and I do hereby declare the following to be a full, clear, and exact description of the same, reference being had to the accompanying drawing and the letters of reference marked thereon.

The nature of my invention consists in providing a trap for the purpose of catching animals, and one that shall instantly kill the animal when caught, and also one that shall present great allurements and few objects of suspicion to the animal.

The following is a full description of my invention as shown in the accompanying drawing.

Figure 1:
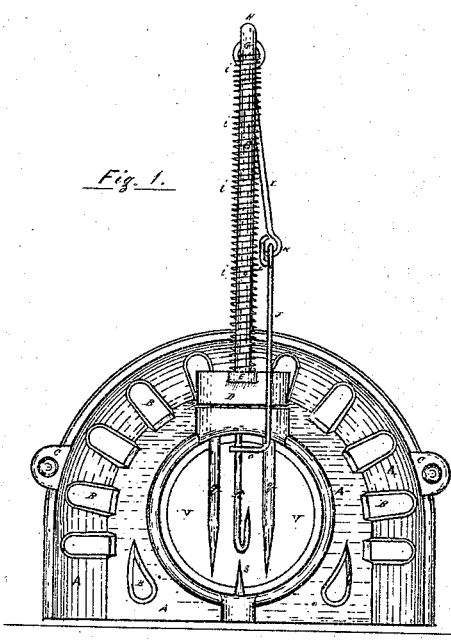
Figure 2:
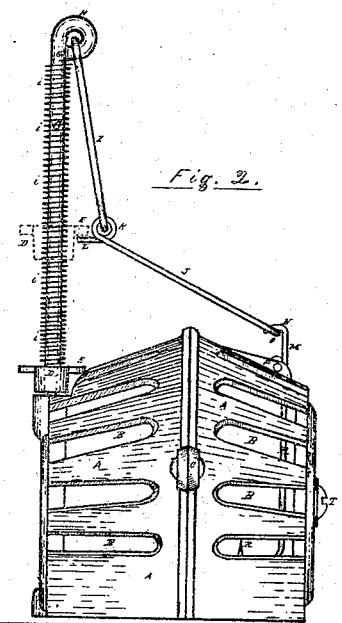
Figure 3:
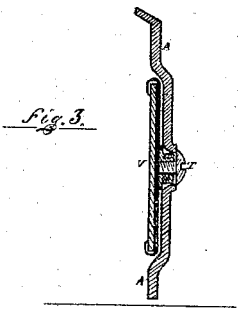

Figure 1 shows a front view of my animal-trap. Fig. 2 shows a side view of the same. Fig. 3 is a sectional view of the back of the same.

The body of the trap is composed of two parts, A A, which are skeleton in form on account of the slots B, B, &c. These are bolted together by rivets in the lugs C C. They are made of cast metal. At the front of the trap there is a hole for the entrance of the animal. Above this rises a standard, G, made of good-sized wire; on this slides the fork-head D, to which are attached the tines $q$ $q$. Around the standard G is also the coil spring $i$, $i$, &c. The standard G terminates in a loop, H, from which extends the rod I, and from I the rod J, which is looped into it at K; said loop having an extension, L. The other end of the rod J has a right-angle turn, O. On the inside of the trap, on the back wall of the same, I have a mirror, V, which is secured there by the screw T. (See Fig. 3.) R is the bait-rod, which is hung at the lug P, and at its upper end has a hook, N. On the lower side of the entrance is a sharp small pike, S.

In order to set the trap the fork-head D is raised up to the point indicated by the dotted lines in Fig. 2. There the end L of the rod J is set under the lug E on the head D, and the end O of the rod J is connected with the hook N of the bait-rod R. Thus arranged the head D is held up, as shown by the dotted lines, Fig. 2. This draws the tines $q$ $q$ up so they do not interfere with the entrance of the animal, who, approaching, sees the bait and also his own reflection in the mirror, and believing it to be another animal approaching without danger, and fearing the other will secure the bait, rushes without fear of danger into the trap, when, springing it, he is instantly pierced through the throat and neck by the tines $q$ $q$ and the pike S. The trap may be used, however, without the mirror, it only serving to allure the animal and allay suspicion of danger.

What I claim as my invention, and desire to secure by Letters Patent, is as follows:

The metallic body A A, constructed as described, in combination with the tines $q$ $q$, head D, spring $i$ $i$, standard G, and rods I, J, and R.

GEO. S. WALKER.

Witnesses:
JNO. K. HALLOCK,
B. B. EVANS.